Feb. 28, 1956  A. J. HEBERT  2,736,796
HOT BOX DETECTOR SYSTEM
Filed Feb. 27, 1953  2 Sheets-Sheet 1

Arthur Joe Hebert
INVENTOR.

Feb. 28, 1956  A. J. HEBERT  2,736,796
HOT BOX DETECTOR SYSTEM
Filed Feb. 27, 1953  2 Sheets-Sheet 2

Arthur Joe Hebert
INVENTOR.

BY *Clarence A. O'Brien*
*and Harvey B. Jacobson*
Attorneys

United States Patent Office 2,736,796
Patented Feb. 28, 1956

2,736,796

HOT BOX DETECTOR SYSTEM

Arthur Joe Hebert, Scott, La., assignor to National Alarms Corporation, Lafayette, La., a corporation of Louisiana Application February 27, 1953, Serial No. 339,410

4 Claims. (Cl. 246—169)

This invention relates to a hot box detector system and particularly for a system utilizing the air pressure in the air pressure line of an air brake system and a valve responsive to over-temperature of the journals of the system for releasing the pressure from the air brake control line.

In the operation of air brakes for the control of vehicles such as railway cars, trucks and the like it is customary to provide an air line or in the event of a railway vehicle a, so-called, train line having pressure applied thereto from a compressor or pump on the locomotive or other propelling device. The brakes of the vehicle being so adjusted that as long as pressure in maintained in the train line or fluid pressure control line the brakes will be released so that the vehicle will be free to move. However, upon release of the air pressure from the train line or air pressure line the brakes will be set so that the vehicle will be stopped. Since the train line or control pressure line is constantly being fed from a source such as a pump or compressor the relief valve in order to be effective in setting the brakes must have sufficient capacity so that the air will be discharged from the train or pressure control line regardless of the attempt of the pump or compressor to maintain the pressure.

In the operation of vehicles such as railroad cars, it frequently happens that the journals become dry or free of lubricant after which the journals may become very hot resulting in a so-called hot box which if continued long enough will melt out the babbit of the bearings and wreck the journal so that the vehicle may be derailed or otherwise damaged.

The present invention provides a detector system for detecting the hot box or other abnormal temperatures in the bearing and releasing the pressure in the train line or pressure control line so that the brakes will be applied and the vehicle will be stopped before the journal is overheated.

This is accomplished by means of a pressure conduit which is communicated with the main train line by any suitable means, preferably a nipple having a control or manual valve therein, so that in the event of necessity the pressure may be relieved in the pressure conduit. The pressure conduit is connected to a valve which has a temperature sensitive device for retaining it in closed position after which the temperature will release the valve to allow air to flow from the pressure line through a pressure transmitting line into valve actuating mechanism for opening an exhaust valve or relief valve for relieving the pressure in the train line or the control pressure line.

It is accordingly an object of the invention to provide an improved hot box detector.

It is a further object of the invention to provide a hot box detector system for relieving the pressure in the pressure control lines of the vehicle.

It is a further object of the invention to provide a temperature control valve for applying actuating pressure to a relief valve.

Other objects and many of the attendant advantages of the present invention will be apparent from the following detailed description taken in conjunction with the accompanying drawing in which.

Figure 1:
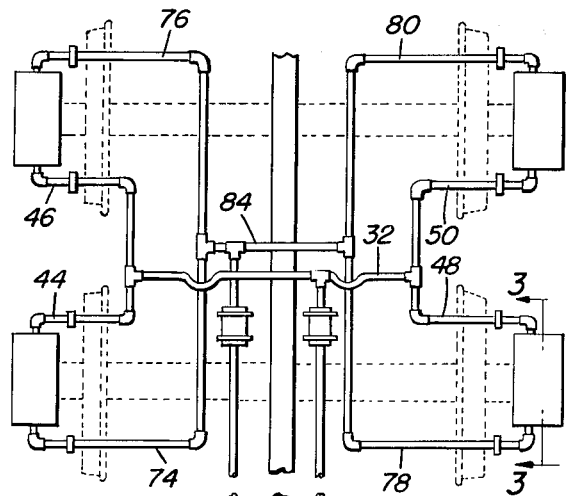
Figure 1 is a schematic illustration of the hot box responsive system according to the invention.
Figure 1:
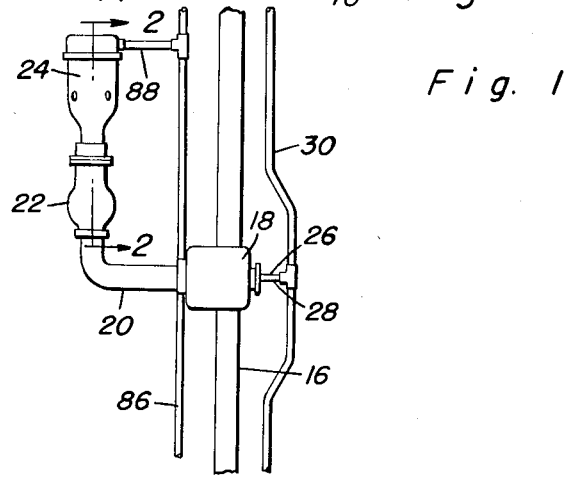
Figure 1:
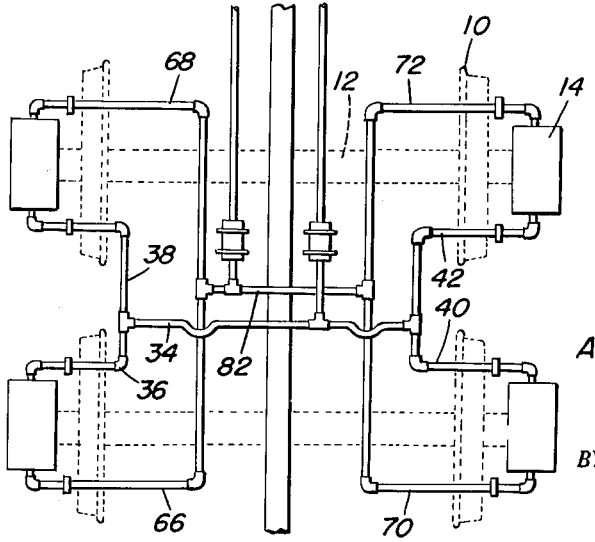
Figure 3:
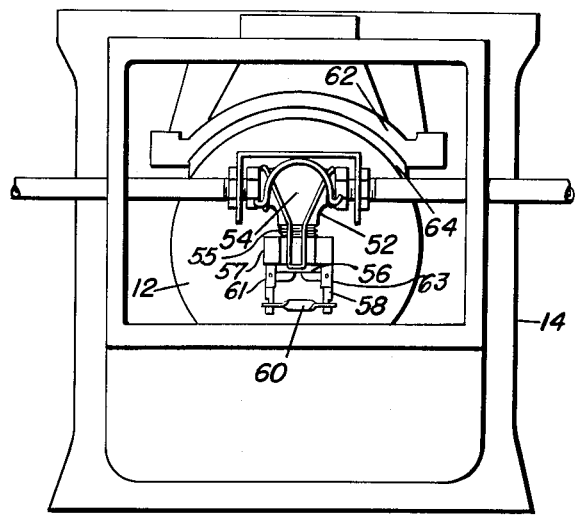
Figure 3 is an elevational view of the detector valve taken substantially on the plane indicated by the line 3—3 of Figure 1.
Figure 2:
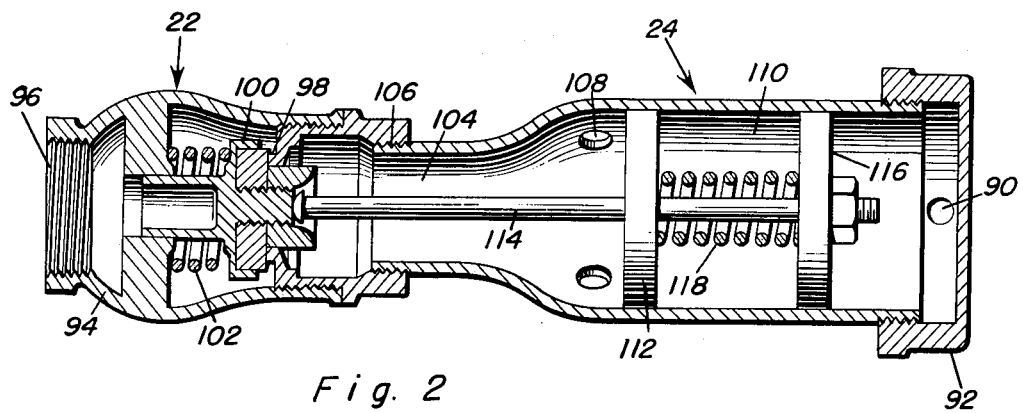
Figure 2 is a sectional view of the pressure actuated relieve valve for the system taken substantially on the plane indicated by the line 2—2 of Figure 1.

The hot box detector system according to the invention includes vehicle supporting wheels 10 usually mounted in pairs on axles 12. The ends of the axles 12 are supported in journal boxes 14 by means of suitable bearings, usually of babbit, 64. An air brake not shown will be applied to the wheels so that the vehicle supported by the wheels may be readily brought to a stop. The air brakes will be controlled by a train line or control pressure line 16 which will be extended lengthwise of the vehicle and extended to the traction device, such as the locomotive, on which a compressor or other pump device will apply pressure in the train line 16 so that the brakes will be controlled by means of the pressure line 16. A high capacity T 18 is mounted in the train line 16 and has a relief conduit 20 connected thereto. The relief conduit 20 is controlled by means of a relief valve 22 which is actuated by a valve actuating device 24. The relief valve 22 and the relief conduit 20 are of sufficient capacity that the entire flow through the line 16 may readily escape through the relief valve 22 when open so that the pressure in the line 16 will be rapidly reduced regardless of the efforts of the pump to support pressure therein.

A hot box detector includes a pressure conduit 30 communicated with the train line 16 by means of a nipple 26 having a valve 28 therein. The pressure conduit 30 is provided with transverse distribution pipes 32 and 34, which are again divided into distributor branches 36, 38, 40, 42, 44, 46, 48 and 50. Each of the branches 36 to 50 goes to a detector valve 52 which has a valve body 54 connected to the conduits 36 to 50 respectively and having a plunger 56 maintained in closing relation in the valve body 54 by means of suitable members such as the bell cranks 58. The neck or valve stem of the body 54 containing projection 55 of the body 54 preferably extends downwardly and is provided with external threads for retaining a gland member 57. The plunger 56 extends outwardly through the gland 57. Pivot posts 61 and 63 are provided on the gland 57 and have bifurcations for receiving the bellcrank members 58. The bell cranks are held in position by suitable means such as a fusible link 60 which is maintained in the journal box 14 adjacent to the end of the journal 12 which moves in the journal bearing 62 having a bearing surface 64 of babbit or other suitable metal. The bellcrank members 58 retain the plunger 56 in closing relation to the valve body 54.

The plunger 56 is held in a load position when the fusible element 60 engages the bellcranks. However, should the temperature responsive link 60 be severed, the plunger 56 can move into a valve open position so that fluid under pressure can be delivered through the valve body 20 thereby allowing flow from the pressure line 30 to the pressure transmitting line 86 and through the conduit 88 into the cylinder 110. Each of the branches 36 to 50 communicates by means of one of the valves 52 to branch conduits 66 to 80 respectively of the transverse pressure transmitting branch lines 82 or 84 which connect to a pressure transmitting line 86. The pressure transmitting line 86 is connected by means of a conduit 88 to an aperture 90 in a cap 92 of the valve actuating mechanism 24.

The relief valve 22 comprises a valve body 94 having an aperture 96 for connection with the conduit 20. The valve seat 98 is mounted in the valve body 94 and a valve 100 is pressed into seating relation with the seat 98 by means of a spring 102. The valve actuating device 24 is connected into the exhaust port 104 by means of a threaded connection 106. The connection 106 is provided with a plurality of apertures 108 which are of sufficient capacity as is the exhaust port 104 so that any pressure in the line 16 will readily flow through the conduit 20 and the open valve through the outlet port 104 and the port 108 with sufficient volume that the line will be readily drained.

The actuating mechanism proper comprises a cylinder 110 defined by means of a cross member or cross head 112 having means for passing a valve actuating stem 114 therethrough. A piston 116 is rigidly mounted on the end of the valve actuating rod 114 and the spring 118 biases the piston to non-valve engaging relation.

In the operation of the system according to the invention air will be admitted from the train line 16 into the pressure conduit 30 and then through the T connections 32 and 34 into the branch terminals 36 to 50 so that each of the valves associated with the journals of the device will be under pressure. The valves will be maintained in closed condition as long as the thermosensitive elements 60 are sufficiently cool. However, should the bearing become overheated the temperature responsive link 60 would be severed allowing the valve to open and flow from the pressure line 30 to the pressure transmitting line 86 and through the conduit 88 into the cylinder 110. The pressure within the cylinder 110 will cause the piston 116 to move forward so that the piston rod 114 will lift the valve 100 off of the seat 98 to open the port thereof so that the air control line 16 will be dissipated and allow the brakes on the vehicle to be set. Further details of the detector valve 52 may be found in my copending application Serial No. 330,378, filed January 9, 1953, and the details of the exhaust valve 24 and the actuating mechanism 25 therefor and be found in my copending application Serial No. 333,031, filed January 26, 1953.

After the train has been brought to rest the hot box condition may be remedied after which the valve 28 may be operated to allow the operator to reset the detector valve so that the train or other vehicle may proceed. In the event it is necessary to move the train without restoring the proper conditions therein it will be possible o operate the valve 28 thus releasing the pressure actuating the valve 22 and allowing it to close so that the brakes may be released and the train moved as may be necessary.

It will thus be apparent that the present invention provides a system for detecting hot boxes and producing the necessary protective measures in response thereto. It will be apparent that the trainman may readily locate the defective car by means of the hiss of the air escaping through the relief valve 22 so that the same may be considered as a signal indicating a dangerous condition.

For purpose of exemplification a presently preferred embodiment of the invention has been shown and described according to the best present understanding thereof. It will be apparent to those skilled in the art that changes and modifications may be made in the construction and arrangement of parts thereof without departing from the true spirit and purpose of the invention.

What is claimed as new is as follows:

1. For use in a vehicle having journal mounted wheels with journal boxes enclosing the journal mountings and air brakes applied to the wheels and controlled by an air pressure line, a hot box responsive system comprising an escape valve communicated with said air pressure line, said escape valve having an air capacity substantially equal to the air capacity of said pressure line, resilient means biasing said escape valve to closed position, an air cylinder, a piston in said cylinder operatively connected to said escape valve, means for applying pressure in said cylinder including a pressure conduit, means communicating said pressure conduit with said pressure line, an air pressure transmitting line communicating with said cylinder, a control valve connecting said pressure conduit to said pressure transmitting line, a temperature responsive element mounted in the journal box in spaced proximity to the end of the journal for retaining said control valve in closed condition.

2. For use in a vehicle having journal bearings, and air actuated brakes with an air pressure control line operatively connected to the brakes, a hot box detector system comprising an escape valve having exhaust ports, said exhaust ports having an air capacity substantially equal to the air capacity of said pressure control line, means biasing said escape valve to closed position, a valve opening cylinder operatively connected to said escape valve, a pressure conduit communicated with said pressure control line, a pressure transmitting conduit communicated with said valve opening cylinder, a detector valve connecting said pressure conduit to said pressure transmitting conduit, a thermo-sensitive element maintaining said detector valve in closed relation, said thermo-sensitive element being maintained in spaced heat receiving relation to said journal bearing.

3. For use in a railway vehicle having journal supported wheels with journal boxes enclosing said journals, air pressure controlled brakes for said wheels and a control pressure line connected to a source of air pressure, a hot box responsive system comprising a pressure conduit communicated with said control pressure line, a pressure transmitting conduit, a detector valve controlling air flow from said pressure conduit to said pressure transmitting conduit, means maintaining said valve in closed condition, a fusible member securing said means, said fusible member being mounted in spaced proximity with said journal, a relief valve having sufficient discharge capacity to reduce the pressure in said control pressure line regardless of the air flow from said source, pressure actuated valve actuating means operatively connected to said relief valve, said pressure transmitting conduit being communicated with said actuating means.

4. For use in a railway vehicle having journal supported wheels with journal boxes enclosing said journals, air pressure controlled brakes for said wheels and a control pressure line connected to a source of air pressure, a hot box responsive system comprising a pressure conduit communicated with said control pressure line, an air pressure transmitting conduit, a detector valve controlling air flow from said pressure conduit to said pressure transmitting conduit, means maintaining said valve in closed condition, a fusible member securing said means, said fusible member being mounted in the journal box adjacent the end of said journal, a relief valve having sufficient discharge capacity to reduce the pressure in said control pressure line regardless of the air flow from said source, pressure actuated valve actuating means operatively connected to said relief valve, said pressure transmitting conduit being communicated with said actuating means, a cut-off valve interposed between said control pressure line and said pressure conduit.

References Cited in the file of this patent

UNITED STATES PATENTS

| | | |
|---|---|---|
| 913,817 | Emmons et al. | Mar. 2, 1909 |
| 1,058,993 | Marvin | Apr. 15, 1913 |
| 2,420,924 | Whittaker | May 20, 1947 |
| 2,588,204 | Cameron et al. | Mar. 4, 1952 |
| 2,619,586 | Kernpf | Nov. 25, 1952 |